US008035524B2

(12) United States Patent
Sakama et al.

(10) Patent No.: US 8,035,524 B2
(45) Date of Patent: Oct. 11, 2011

(54) RFID TAG MOUNTING PACKAGE AND MANUFACTURING METHOD THEREOF

(75) Inventors: Isao Sakama, Hiratsuka (JP); Koichi Tachibana, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 693 days.

(21) Appl. No.: 12/039,453

(22) Filed: Feb. 28, 2008

(65) Prior Publication Data

US 2009/0027210 A1 Jan. 29, 2009

(30) Foreign Application Priority Data

Jul. 25, 2007 (JP) .................................. 2007-193002

(51) Int. Cl.
*G08B 13/14* (2006.01)

(52) U.S. Cl. ................................. 340/572.8; 340/572.1
(58) Field of Classification Search ..... 340/572.1–572.9
See application file for complete search history.

(56) References Cited

U.S. PATENT DOCUMENTS

| 2006/0054710 A1* | 3/2006 | Forster et al. ................. 235/492 |
| 2008/0042849 A1* | 2/2008 | Saito et al. ................. 340/572.7 |

FOREIGN PATENT DOCUMENTS

| JP | 2002-049905 | 2/2002 |
| JP | 2005-309811 | 11/2005 |

* cited by examiner

*Primary Examiner* — Benjamin C Lee
*Assistant Examiner* — Michael T Shannon
(74) *Attorney, Agent, or Firm* — Mattingly & Malur, PC

(57) ABSTRACT

In an RFID tag mounting package mounted with an RFID tag and a manufacturing method thereof, in order to have sufficient communication performance without spoiling the design property of the package to which a conductive film is applied, a package is obtained by assembling a structural material in which a metallic film is formed on a base material made of paper or the like. In the package, a slot is provided in the metallic film of a folded portion, in a spot where portions (the folded portion and an external packaging portion) of the structural material overlap each other. An inlet operates as an RFID tag, includes an antenna and an IC chip connected to the antenna, and is mounted on the inner surface of the folded portion in conformity with the position of the slot.

23 Claims, 20 Drawing Sheets

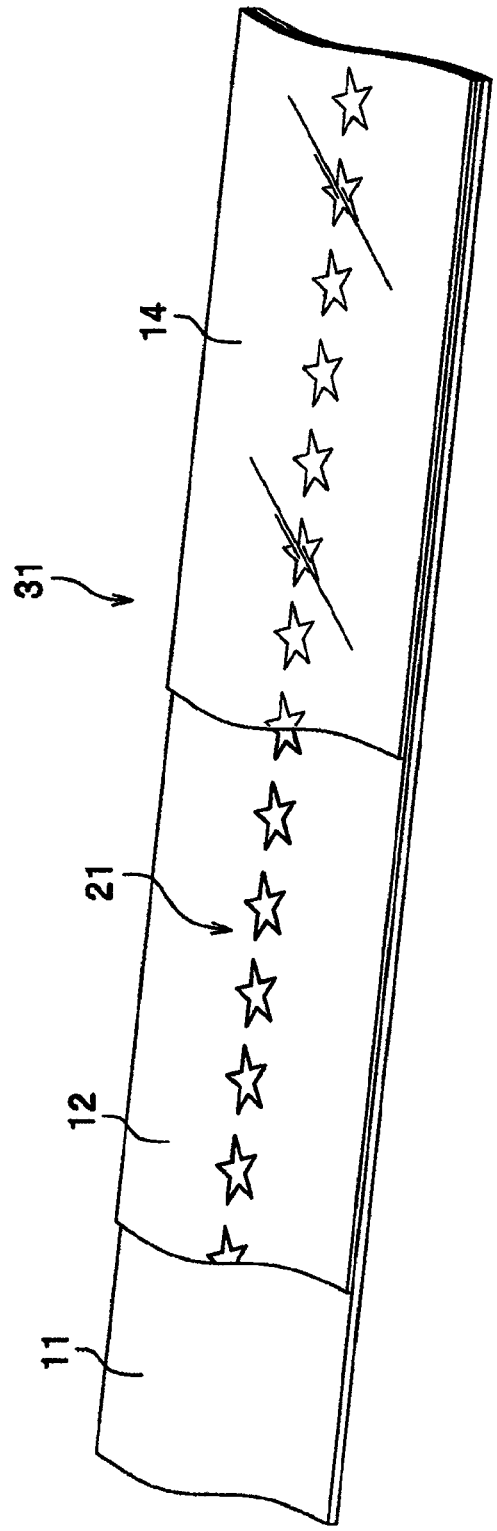
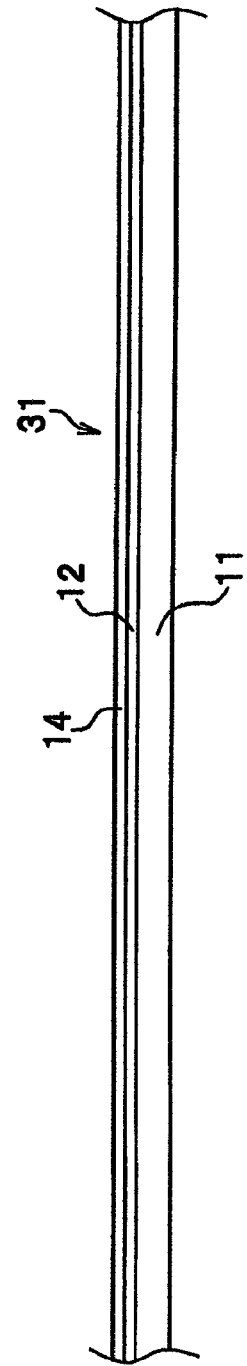
FIG.11A
FIG.11B

BLANKING

ASSEMBLING

RFID TAG MOUNTING PACKAGE AND MANUFACTURING METHOD THEREOF

INCORPORATION BY REFERENCE

The present application claims priority from Japanese application JP2007-193002 filed on Jul. 25, 2007, the content of which is hereby incorporated by reference into this application.

BACKGROUND OF THE INVENTION

The present invention relates to an RFID (Radio Frequency Identification) tag mounting package, and a manufacturing method thereof. Particularly, the invention relates to the art of mounting an RFID tag on an object obtained by applying a film, such as aluminum, to paper or the like.

DESCRIPTION OF RELATED ART

In order to manage articles, such as commodities, a method of attaching a non-contact readable IC tag (RFID tag) to a package that packages each article to identify the article is performed widely. This package is made of, for example, box-shaped pulp paper, and various kinds of contrivance are performed in accordance with the characteristics of the articles (commodities) to be packaged. Packages that package high-unit-cost commodities, such as high-grade cosmetics, make consumers feel beauty and texture, have designs reflecting the deluxe feeling of the commodities, and are manufactured with reasonable cost and effort.

As an example of enhancing the design property of a box-shaped package, there is a method of forming an aluminum film on the whole outer surface of a paper material that becomes a base material, and printing characters or patterns or performing coating from above the aluminum film. According to this method, since the aluminum film gives a metallic feeling with verisimilitude or a massive feeling to the appearance of a package, the beauty or texture of the package is improved.

Meanwhile, in order to manage information about the article contents of a package, a "Package with Data Carrier" in which a label-shaped non-contact data carrier is pasted on the inner surface or outer surface of a paper or plastic package is known conventionally (refer to JP-A-2002-49905).

Further, it is generally known that, if an RFID tag is closely attached to a metallic surface, communication distance becomes very short. Thus, an "RFID Tag" that has a soft magnetic material or spacer on an attachment surface, and is operated while being attached to a metallic article is known (refer to JP-A-2005-309811).

However, in the "Package with Non-contact Data Carrier" disclosed in JP-A-2002-49905, in a case where a package on which the abovementioned aluminum film is formed is used, an electromagnetic signal is shielded when the non-contact data carrier is pasted on the inside of the package so as not to spoil the design property of the package. Therefore, there is a problem in that the non-contact data carrier cannot be read from the outside of the package. In this case, when the non-contact data carrier is pasted on the outside of the package, there are problems in that the design property of the package is spoiled greatly because the non-contact data carrier is exposed on the outside of the package, and an antenna portion of the non-contact data carrier and the aluminum film are very close to each other, and have an influence on each other, so that the communication distance becomes very short.

Further, JP-A-2005-309811 makes the assumption that the tag is attached to a metal-containing article. However, in a case where the tag is attached to the outer surface of a package on which an aluminum film is formed, sufficient communication performance is not obtained if the soft magnetic material or spacer is thin. For this reason, there is a problem in that, if the thickness of the soft magnetic material or spacer is secured sufficiently in order to obtain sufficient communication performance, the RFID tag protrudes from the attachment surface, and the design property of the package is spoiled conspicuously.

BRIEF SUMMARY OF THE INVENTION

The invention has been made in view of the above problems. It is therefore an object of the invention to provide an RFID tag mounting package mounted with an RFID tag and a manufacturing method thereof so as to have sufficient communication performance without spoiling the design property of the package to which a conductive film is applied.

In order to achieve the above object, for the RFID tag mounting package according to the invention, in a package body obtained by assembling a structural material on which a conductive film is formed, a slot is provided in the conductive film of the structural material inside a spot where a "gap" is formed in the package body, such as a spot where portions of the structural material overlap each other, and an RFID tag is mounted on the inner surface of the structural material inside the spot in conformity with the position of the slot. In addition, the gap includes not only a simple space but a spot where a nonconductive material is set.

As for details of the means of the invention, the technical idea thereof will be expressed concretely through descriptions, such as the "Detailed Description of the Invention" to be described below.

According to the invention, it is possible to provide an RFID tag mounting package mounted with an RFID tag and a manufacturing method thereof so as to have sufficient communication performance without spoiling the design property of the package to which a conductive film is applied.

Other objects, features and advantages of the invention will become apparent from the following description of the embodiments of the invention taken in conjunction with the accompanying drawings.

BRIEF DESCRIPTION OF THE DRAWINGS

FIG. 4A is an overall perspective view of the package, FIG. 4B is a sectional view when the package is seen in the direction of IVB-IVB shown in FIG. 4A, FIG. 4C is an enlarged sectional view of a portion surrounded in a dotted line in FIG. 4B, and FIG. 4D is an enlarged view when a pasted portion of an inlet of the structural material is seen from the inside of the structural material toward the outside thereof;

FIG. 6A is a plan view of the inlet, FIG. 6B is a sectional view of the inlet as seen in the direction of VIB-VIB shown in FIG. 6A, FIG. 6C is a bottom view of an IC chip, and FIG. 6D is a plan view of the inlet excluding the IC chip;

FIG. 11A is a perspective view of a structural material before being blanked, and FIG. 11B is a side view showing the structural material before being blanked;

DETAILED DESCRIPTION OF THE INVENTION

Next, embodiments according to the invention will be explained in detail with reference to the accompanying drawings.

Figure 1:
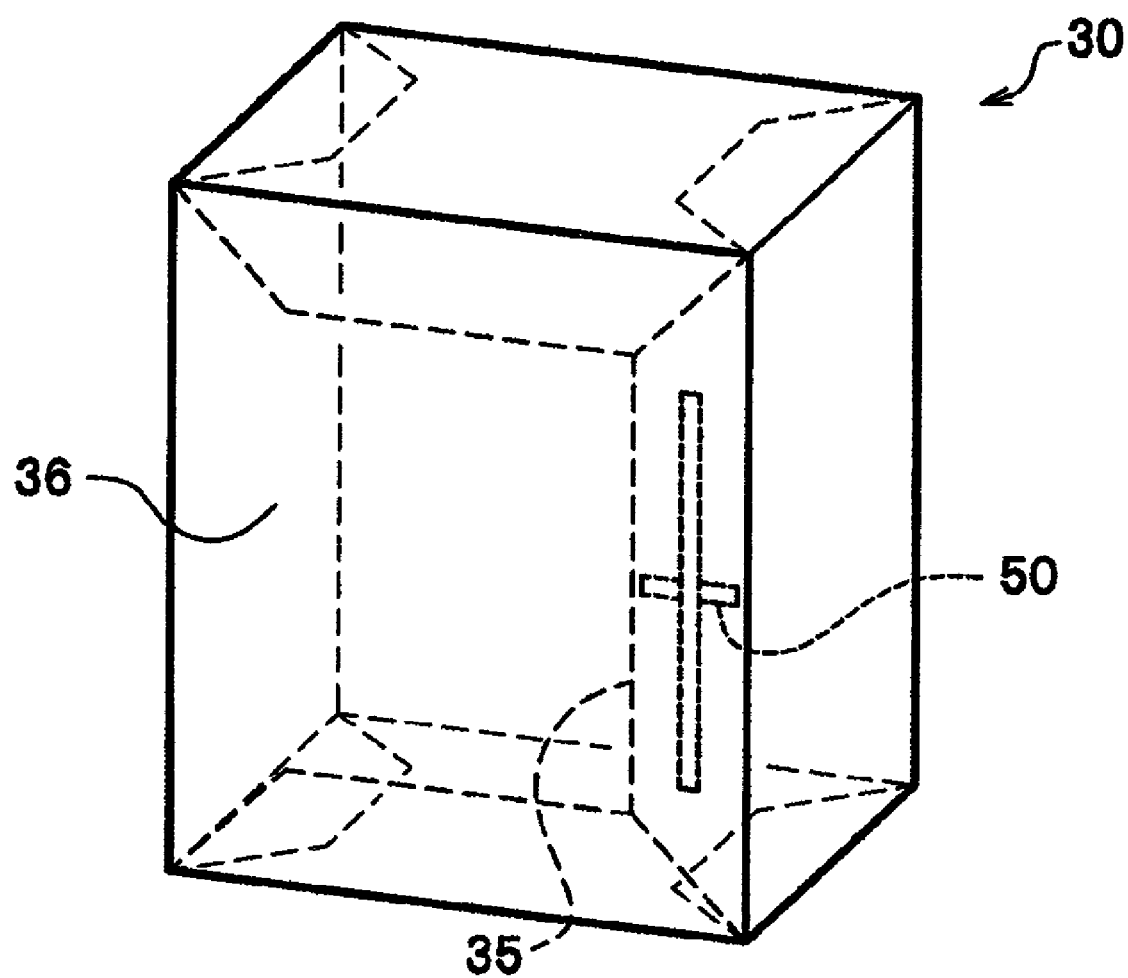
FIG. 1 is a see-through perspective view showing a package of one embodiment according to the invention.

FIG. 1 is a see-through perspective view showing a package 30 of one embodiment according to the invention.

This package 30 is a box-shaped container for packaging articles (not shown), such as commodities including high-grade cosmetics, in an internal space. In this description, portions constituting outer surfaces of the package 30 are referred to as external packaging portions 36, and portions that can be folded inward of the external packaging portions 36 and be used as, for example, pasted tabs or folded tabs, are referred to as folded portions 35.

Although the package 30 is shown in the shape of a rectangular parallelepiped (hexahedron) in this embodiment, the package may have other shapes having such dimensions that the aforementioned articles can be packaged. That is, the package 30 may have, for example, a polygonal prismatic shape, such as a triangular prismatic shape or a pentagonal prismatic shape, or a columnar shape; a polygonal pyramidal shape, such as a quadrangular pyramidal shape or a triangular pyramidal shape, or a conical shape; and other polyhedral shapes. Further, the package 30 may have shapes including three-dimensional curved surfaces in addition to shapes consisting of two-dimensional planes if it is a structure having the external packaging portions 36 and the folded portions 35. Otherwise, the package can be realized as a bag-like package if a member has an overlapping portion.

Figure 2:
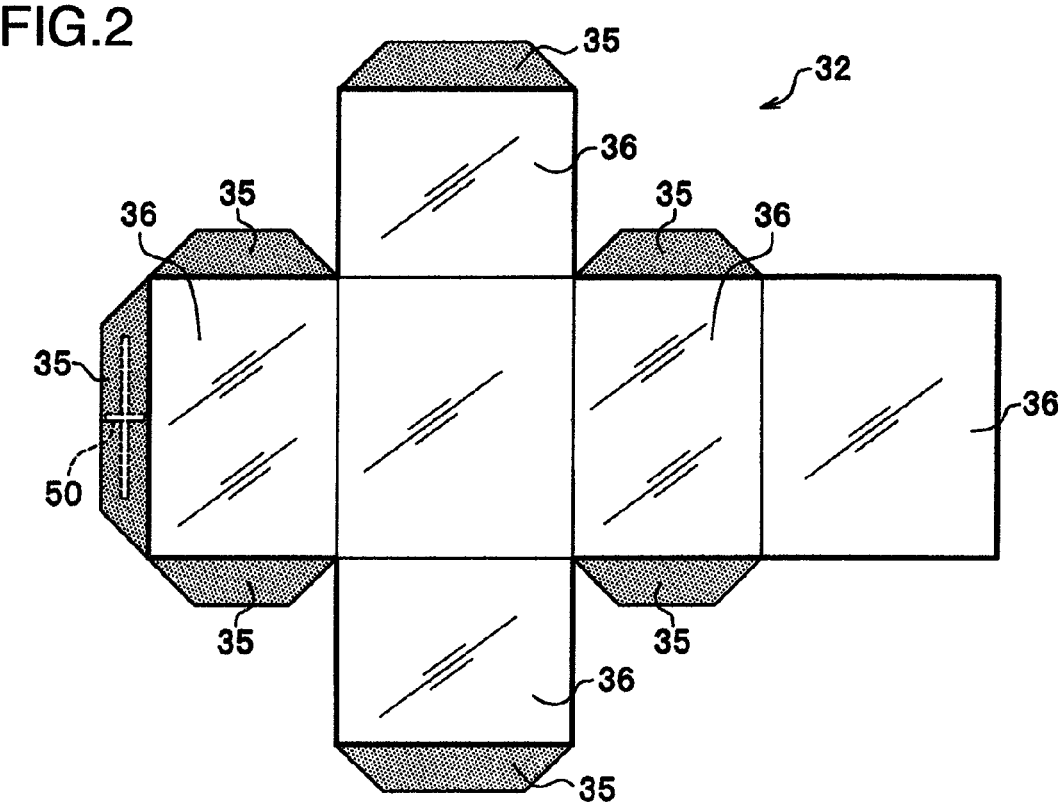
FIG. 2 is an assembly and development view showing the planar shape of a structural material (after being blanked) obtained by developing the package.

FIG. 2 is an assembly and development view showing the planar shape of a structural material 32 (after being blanked) obtained by developing the package 30. In this drawing, the folded portions 35 are shown by hatching, and the external packaging portions 36 are not shown by hatching.

In assembling the package 30 (refer to FIG. 1), first, a box having the shape of a rectangular parallelepiped is formed by folding the respective external packaging portions 36 of the structural material 32 that is blanked in predetermined dimensions and shape. The respective folded portions 35 are folded inward of the external packaging portions 36. Accordingly, in the spots where the folded portions 35 are folded, the structural material 32 (the folded portions 35 and the external packaging portions 36) overlaps.

Figure 3:
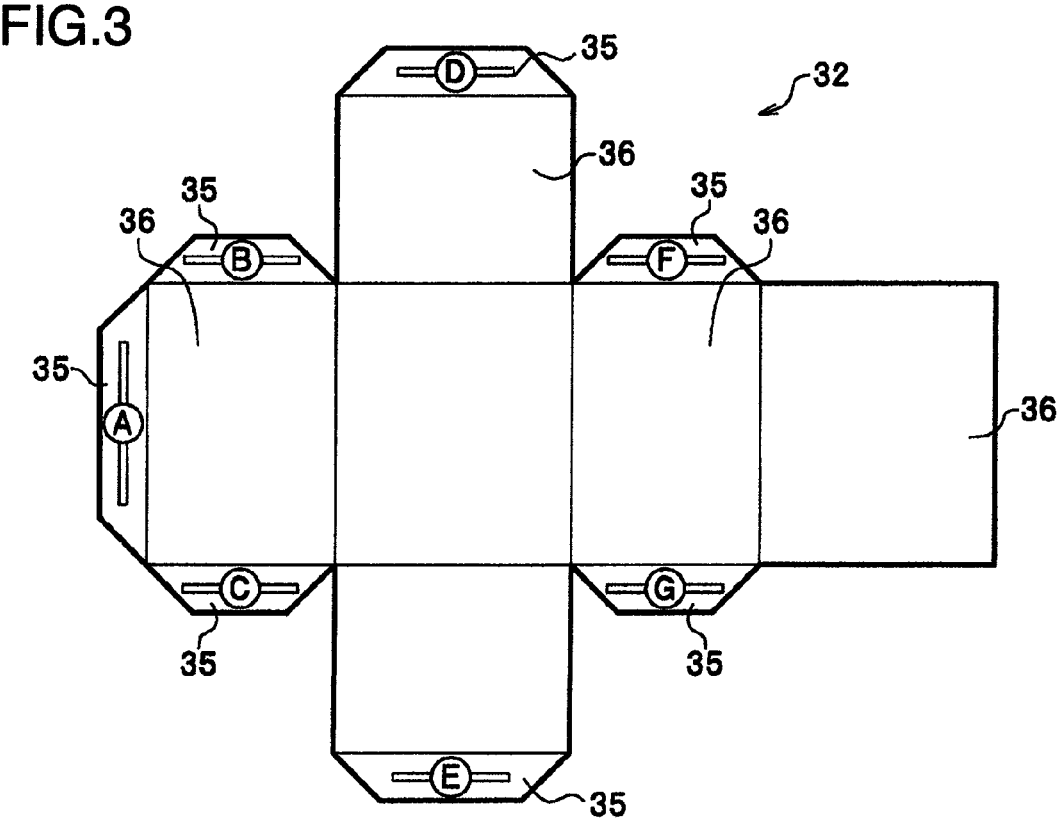
FIG. 3 is an explanatory view of an arrangement showing mounting positions of an RFID tag in the structural material (after being blanked)

FIG. 3 is an explanatory view of an arrangement showing mounting positions A to G of an RFID tag 50 in the structural material 32 (after being blanked).

The RFID tag 50 (refer to FIG. 1) of the package 30 (refer to FIG. 1) is mounted on any of the mounting positions A to G given to the folded portions 35, respectively. Although a case where the RFID tag 50 is mounted on the mounting position A will be described, the RFID tag 50 may be arranged in one of the mounting positions A to G, or may be arranged in two or more of the mounting positions A to G. It is desirable that mounting of the RFID tag 50 is performed, for example, by applying adhesive or a sticking agent on the RFID tag 50 for fixing or by using a sticky tape or the like.

Even if the RFID tag 50 is arranged in any of the mounting positions A to G, the RFID tag 50 will be located at the back of an external packaging portion 36, and will also be located in the vicinity of a seam of the structural material 32.

Figure 4A:
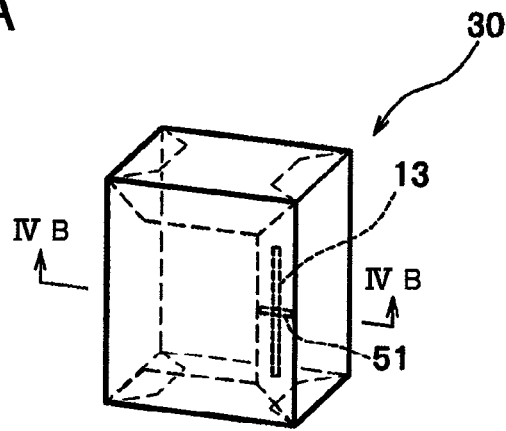
FIGS. 4A to 4D are views showing the whole or a part of the package.
Figure 4B:
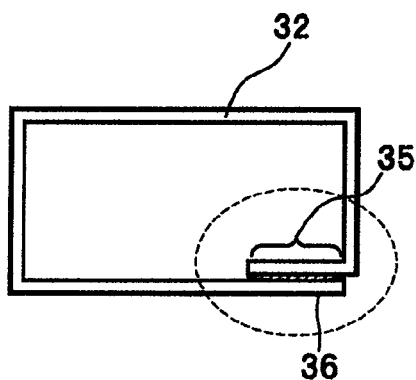
Figure 4C:
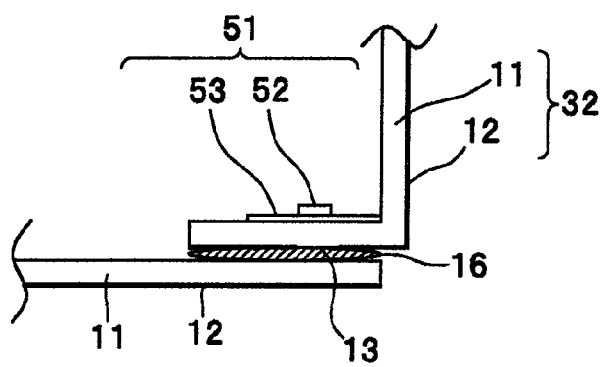
Figure 4D:
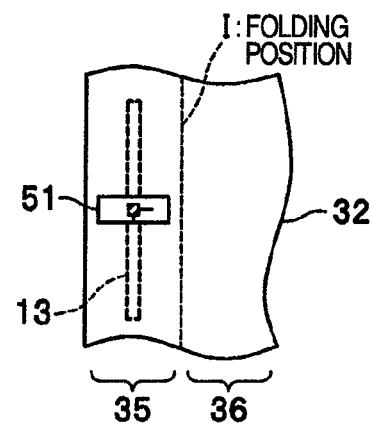

FIGS. 4A to 4D are views showing a whole or a part of the package 30, FIG. 4A is an overall perspective view of the package 30, FIG. 4B is a sectional view when the package 30 is seen in the direction of IVB-IVB shown in FIG. 4A, FIG. 4C is an enlarged sectional view of a portion surrounded in a dotted line in FIG. 4B, and FIG. 4D is an enlarged view when a pasted portion of an inlet 51 of the structural material 32 is seen from the inside of the structural material 32 toward the outside thereof.

If a section of the package 30 shown in FIG. 4A is seen in the direction of IVB-IVB, as shown in FIG. 4B, in a hollow structure surrounded by the structural material 32, an external packaging portion 36 and a folded portion 35 overlap each other, and a slight gap is formed between the external packaging portion 36 and the folded portion 35. If the overlapping portion is enlarged as shown in FIG. 4C, the inner surface of the overlapping portion is mounted with the inlet 51 composed of an IC chip 52, an antenna 53, etc. and operating as the RFID tag 50.

The structural material 32 is obtained by forming a metallic film 12 on one surface of a base material 11. The base material 11 is a dielectric material, and typically paper or paperboard made of pulp or the like, but may be hard or soft plastic, cloth, non-woven fabric, wood, or the like. The metallic film 12 is typically aluminum, but may be other metals or alloys, such as silver, copper and platinum. From the viewpoint of improving the design property of the package 30, that having good malleability and aesthetic gloss may be used. Instead of the metallic film 12, a non-metallic conductive film can be used. In order to improve the design property or durability, the surface (inner surface) of the base material 11 or the surface (outer surface) of the metallic film 12 may be covered with plastic such as PET.

When the structural material 32 is assembled into the package 30, as shown in FIGS. 4B and 4C, the overlapping portion of the external packaging portion 36 and the folded portion 35 is secured with adhesive 16. Depending on the structure of the package 30, however, the assembling may be performed not by using the adhesive 16, but simply by inserting the folded portion 35 into the inner side of the external packaging portion 36.

As shown in FIG. 4D, the inlet 51 is mounted on a slot 13 formed in the folded portion 35. For this reason, as shown in FIG. 4C, a signal sent by the IC chip 52 becomes an electromagnetic wave or an electromagnetic field through the antenna 53, is transmitted through the base material 11, is transmitted through the adhesive 16 via the slot 13, and is radiated to the outside of the package 30. A signal of an electromagnetic wave or an electromagnetic field that is radiated to the package 30 from the outside also reaches the IC chip 52 along a route reverse to the above route. In a case where the assembling of the package 30 is performed without the adhesive 16, a slight gap is formed between the external packaging portion 36 and the folded portion 35. Thus, a stronger signal is transmitted and received by the IC chip 52.

Figure 5A:
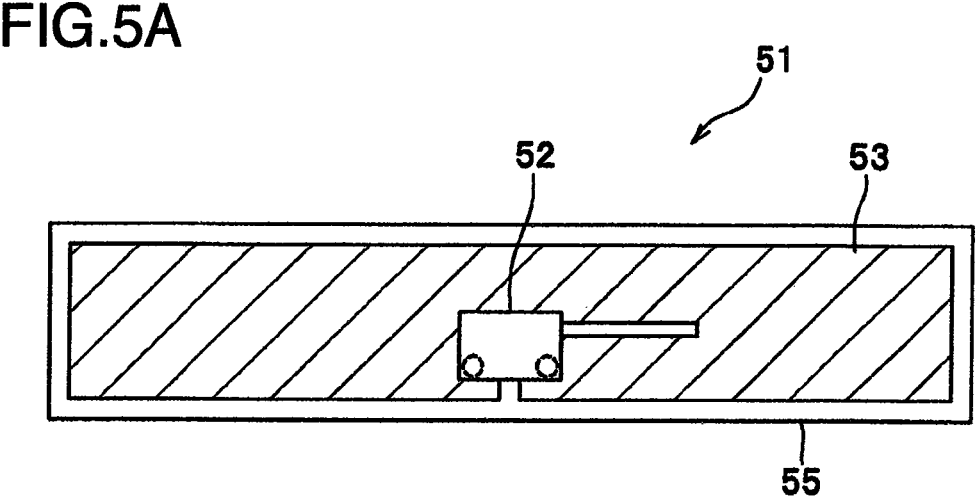
FIG. 5A is a plan view showing an inlet having a dipole-type antenna.
Figure 5B:
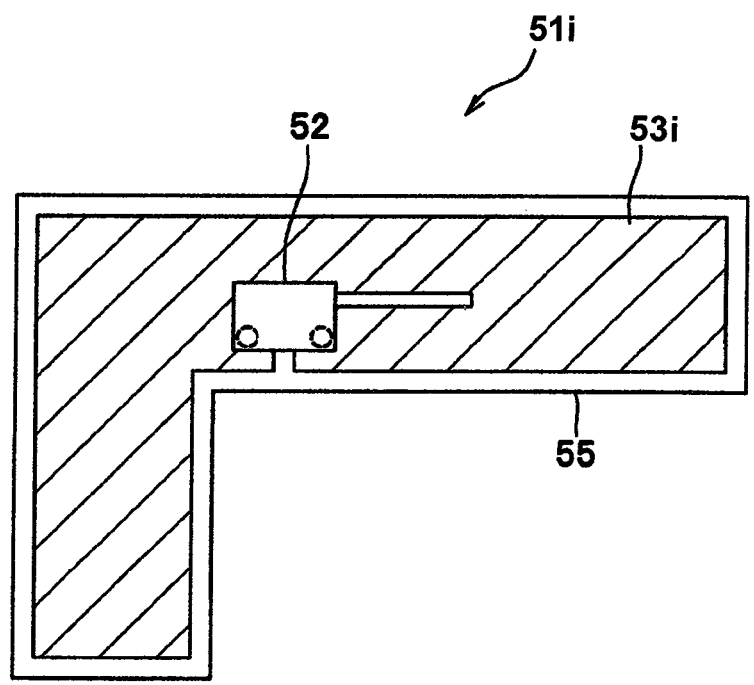
FIG. 5B is a plan view showing an inlet having an L-shaped dipole antenna.

FIG. 5A is a plan view showing the inlet 51 having a dipole-type antenna 53, and FIG. 5B is a plan view showing an inlet 51i having an L-shaped dipole antenna 53i.

In this way, as the type of the standard antenna of the inlet 51, 51i, other types of antennas may be used if they can be mounted on the inner surface of the package 30, and can transmit and receive a signal by an electromagnetic wave or an electromagnetic field through the slot 13.

Figure 6A:
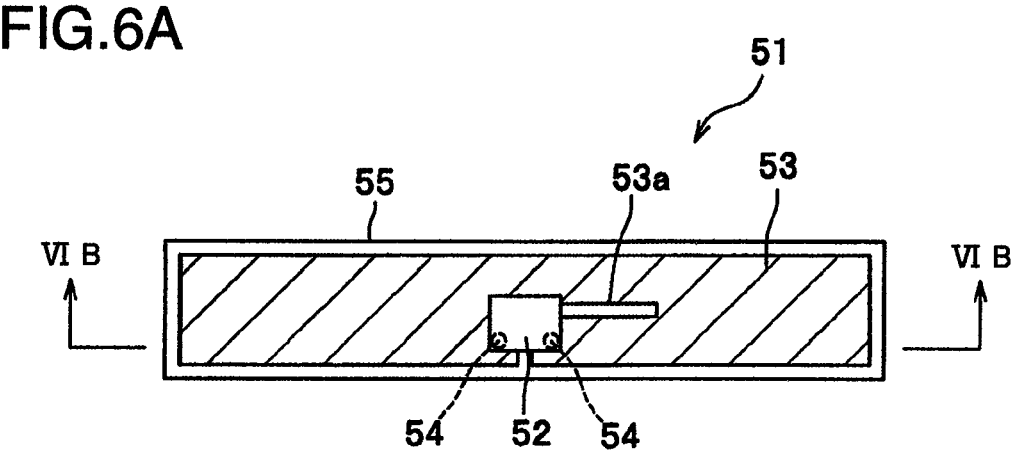
FIGS. 6A to 6D are exploded configuration views showing the inlet in detail.
Figure 6B:
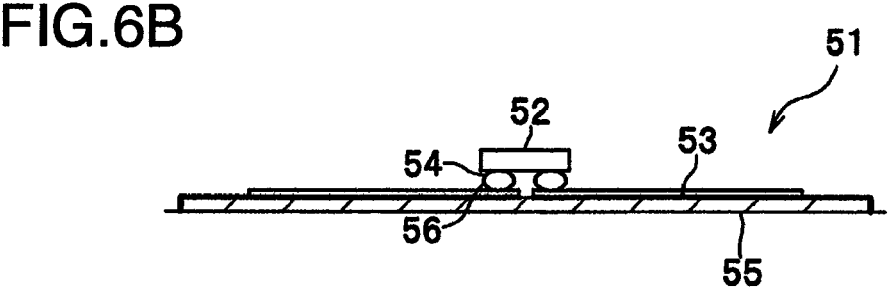
Figure 6C:
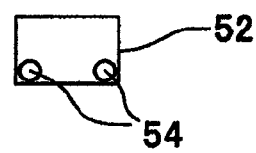
Figure 6D:
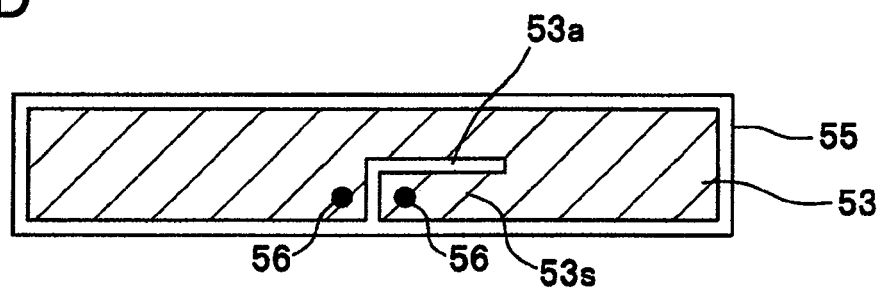

FIGS. 6A to 6D are exploded configuration views showing the inlet 51 in detail, FIG. 6A is a plan view of the inlet 51, FIG. 6B is a sectional view of the inlet 51 as seen in the direction of VIB-VIB shown in FIG. 6A, FIG. 6C is a bottom view of the IC chip 52, and FIG. 6D is a plan view of the inlet 51 excluding the IC chip 52.

As shown in FIG. 6A, the inlet 51 is obtained by forming a conductive antenna 53 having a slit 53a on a base film 55 including a dielectric film, such as PET, and by connecting the IC chip 52 for RFID, such as a μ-chip (or mu-chip) (registered trademark), having a transmission and reception function, a power extraction function, an arithmetic control function, a nonvolatile memory function, and the like.

It is desirable that the antenna 53 is printed and formed by using a conductive material, such as silver paste, or is formed by vapor-depositing a conductor after required masking is performed. Further, without using the base film 55, the antenna 53 may be formed directly on the base material 11 of the package 30.

As shown in FIG. 6D, the antenna 53 is obtained by providing an L-shaped slit 53a to form a stub 53s for impedance matching, and by providing IC connecting portions 56 at this spot (on the stub 53s side, and on the side opposite to the stub 53s across the slit 53a) as a feeding point. The IC connecting portions 56 may be plated with gold, tin, or the like, and the other portions may be coated with a resist material.

As shown in FIG. 6C, signal input/output portions of the IC chip 52 are formed with connecting pads 54, such as gold bumps.

As shown in FIG. 6B, the connecting pads 54 of the IC chip 52 and the IC connecting portions 56 of the antenna 53 are electrically connected by using, for example, ultrasonic joining or an anisotropic conductive film.

With this configuration, the capacitance of the IC chip 52 is cancelled by the capacitance of the stub 53s, whereby the impedances of the IC chip 52 and the antenna 53 are matched with each other. Therefore, loss of signals to be transmitted and received is suppressed. For this reason, sufficient communication performance is obtained even if a short antenna 53 whose actual length is made shorter than a length completely tuned to a received signal is used. Thus, the total length (approximately equal to the total length of the inlet 51) of the antenna 53 can be made short. In addition, instead of the inlet 51, other elements having the same functions as the above ones, such as one obtained by forming an antenna coil on a chip, may be used.

Figure 7A:
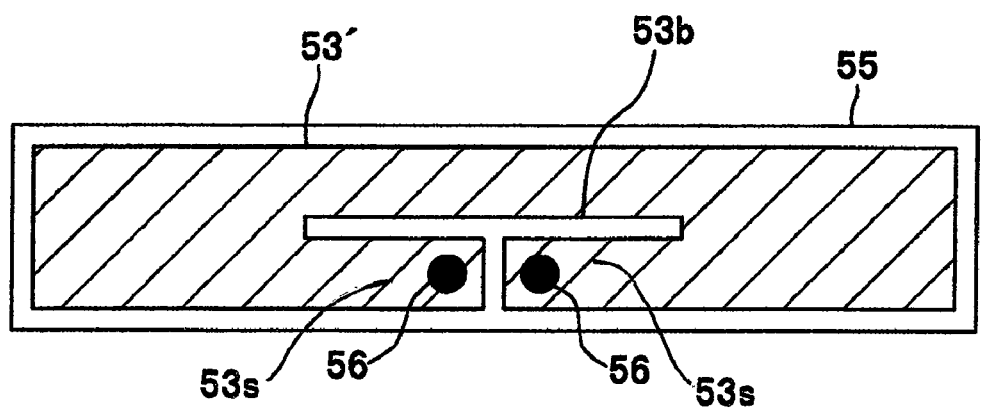
FIGS. 7A and 7B are plan views showing antennas of a modified example.
Figure 7B:
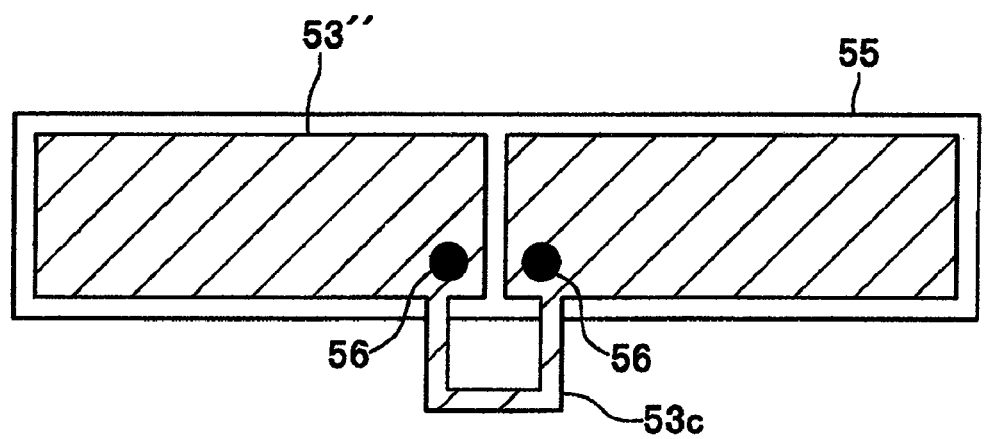

FIGS. 7A and 7B are plan views showing antennas 53' and 53" of a modified example.

The antenna 53' shown in FIG. 7A is obtained by providing a T-shaped slit 53b, and stubs 53s are formed on both of the IC connecting portions 56.

The antenna 53" shown in FIG. 7B is obtained by interposing a U-shaped stub 53c between elements of the antenna 53" that are split in two.

Both of the antennas 53' and 53" operate similarly to the abovementioned antenna 53 (refer to FIGS. 6A to 6D).

Figure 8A:
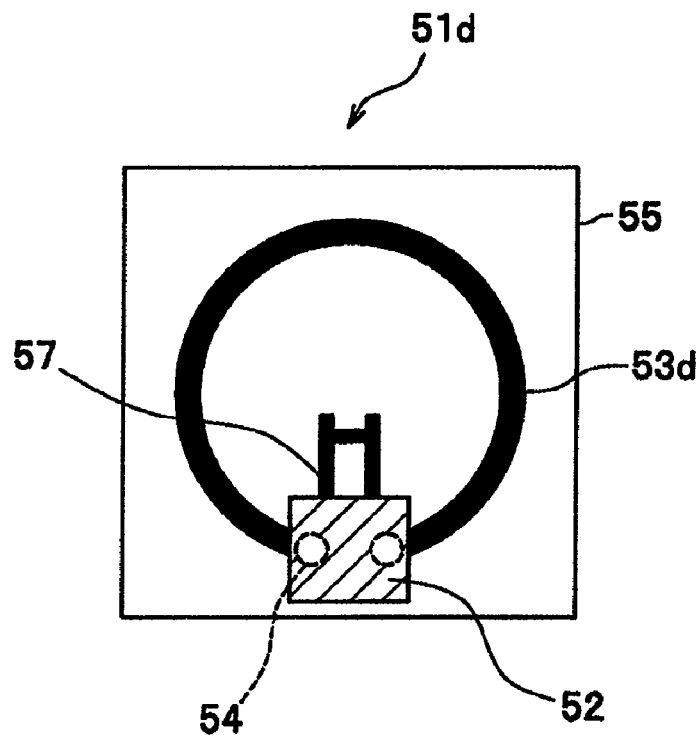
FIGS. 8A and 8B are plan views showing an antenna of another modified example.
Figure 8B:
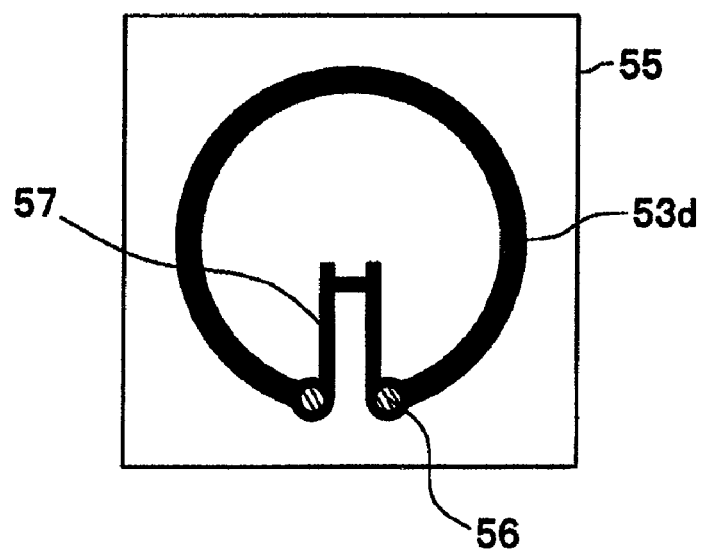

FIGS. 8A and 8B are plan views showing an antenna 53d of another modified example.

As shown in FIG. 8B, the antenna 53d is obtained by forming a loop-shaped antenna 53d connected to the IC connecting portions 56 and a U-shaped stub 57 similarly connected to the IC connecting portions 56, on the base film 55.

As shown in FIG. 8A, by connecting the connecting pads 54 of the IC chip 52 to the IC connecting portions 56, the inlet 51d that operates similarly connected to the aforementioned inlet 51 (refer to FIGS. 6A and 6B) is formed.

Figure 9A:
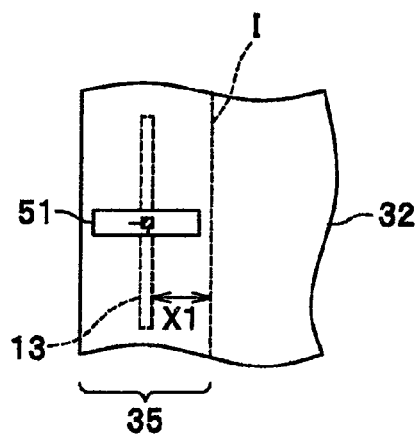
FIGS. 9A and 9B are explanatory views showing the inlet mounted on the package.
Figure 9B:
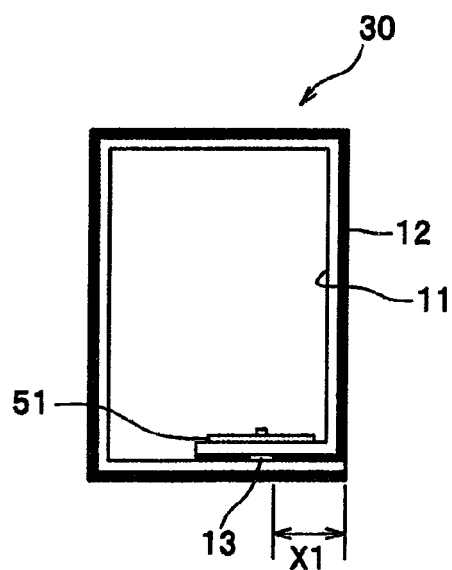

FIGS. 9A and 9B are explanatory views showing the inlet 51 mounted on the package 30.

As shown in FIG. 9B, in order to reduce attenuation of a signal including an electromagnetic wave or an electromagnetic field passing through the slot 13, it is desirable to make a distance X1 by which the signal is transmitted through the base material 11 as short as possible.

Accordingly, as shown in FIG. 9A, it is desirable that the inlet 51 mounted on the slot 13 is mounted so as not to stick out to the outside, and the slot 13 is positioned apart by the distance X1 from a folding position I. The distance X1 is a length obtained by adding a slight margin to about half of the total length of the inlet 51. The total length of the inlet 51 is 18 mm.

Figure 10A:
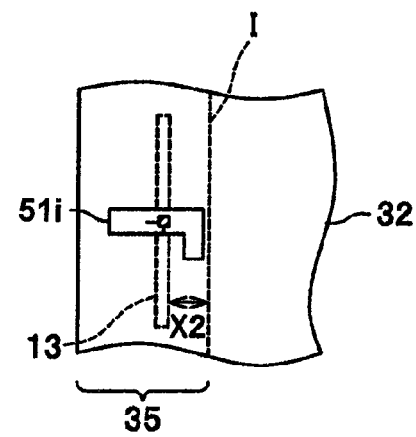
FIGS. 10A and 10B are explanatory views showing another inlet mounted on the package.
Figure 10B:
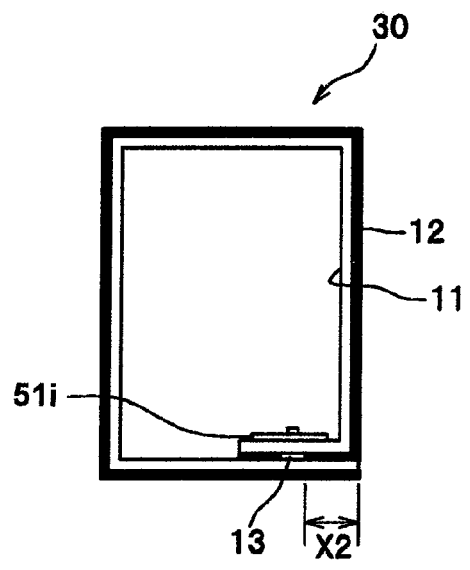

FIGS. 10A and 10B are explanatory views showing another inlet 51i mounted on the package 30.

As shown in FIG. 10B, in order to reduce attenuation of a signal including an electromagnetic wave or an electromagnetic field passing through the slot 13, it is desirable to make a distance X2 by which the signal is transmitted through the base material 11 as short as possible.

Accordingly, as shown in FIG. 10A, it is desirable that the inlet 51*i* mounted on the slot 13 is mounted so as not to stick out to the outside, and the slot 13 is positioned apart by the distance X2 from the folding position I. The distance X2 is a length obtained by adding a slight margin to the width of the inlet 51 because the inlet 51*i* is L-shaped. The total length of the inlet 51*i* is 10 mm.

For this reason, the distance by which the signal is transmitted through the base material 11 is shorter in a case where the L-shaped inlet 51*i* shown in FIGS. 10A and 10B is used, compared with a case where the inlet 51 is as shown in FIGS. 9A and 9B. Therefore, attenuation of the signal becomes small.

FIG. 11A is a perspective view of a structural material 31 before being blanked, and FIG. 11B is a side view showing the structural material 31 before being blanked. In these drawings, in order to clearly show the layer configuration of the structural material 31 or the like, the structural material is exaggeratedly shown in the direction of layers.

As shown in these drawings, by continuously performing the steps of forming the metallic film 12 on a long base material 11, performing printing with the surface of the metallic film as a printing surface 21, and forming a protective film 14 that is made of plastic, such as PET, to protect the metallic film 12 and the printing surface 21, the structural material 31 can be manufactured with high productivity.

Figure 12A:
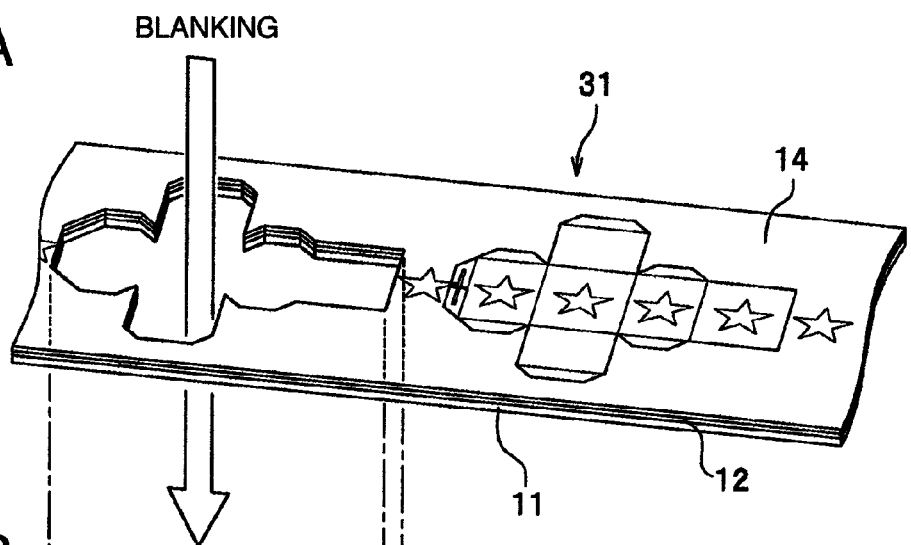
FIGS. 12A to 12C are explanatory views showing the steps of assembling the package from the structural material.
Figure 12B:
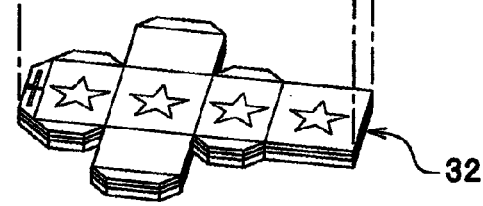
Figure 12C:
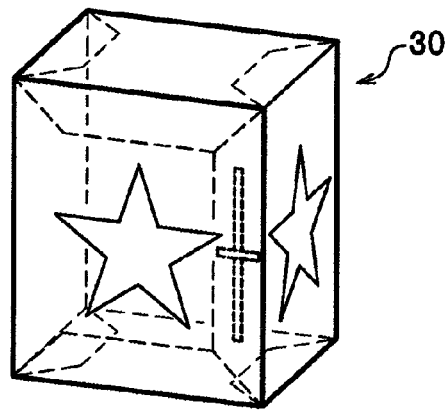

FIGS. 12A to 12C are explanatory views showing the steps of assembling the package 30 from the structural material 31.

By continuously performing the steps of blanking the structural material (after being blanked) 32 (refer to FIG. 2) shown in FIG. 12B from the structural material 31, as shown in FIG. 12A, and forming the package 30 shown in FIG. 12C by assembling the structural material 32, the package 30 can be manufactured with high productivity.

Figure 13A:
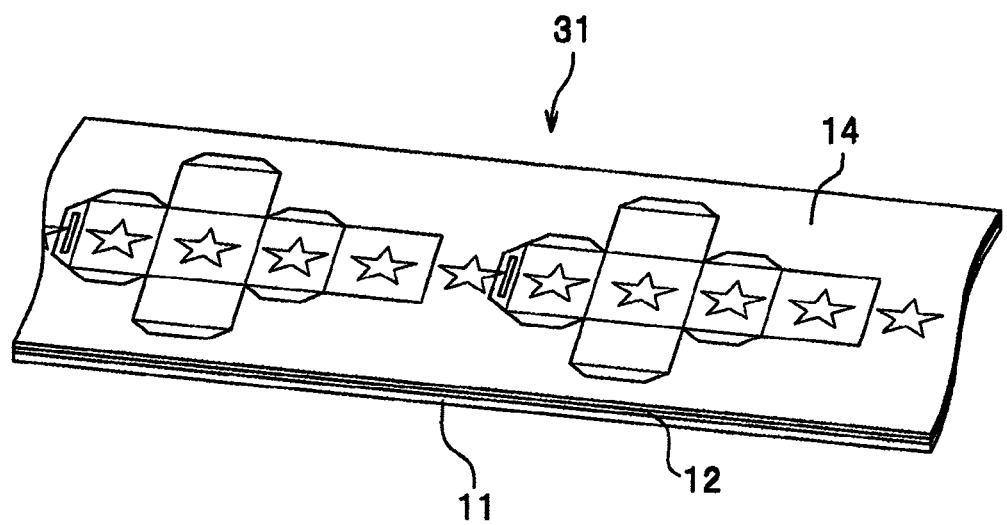
FIGS. 13A to 13C are explanatory views showing the step of forming a slot.
Figure 13B:
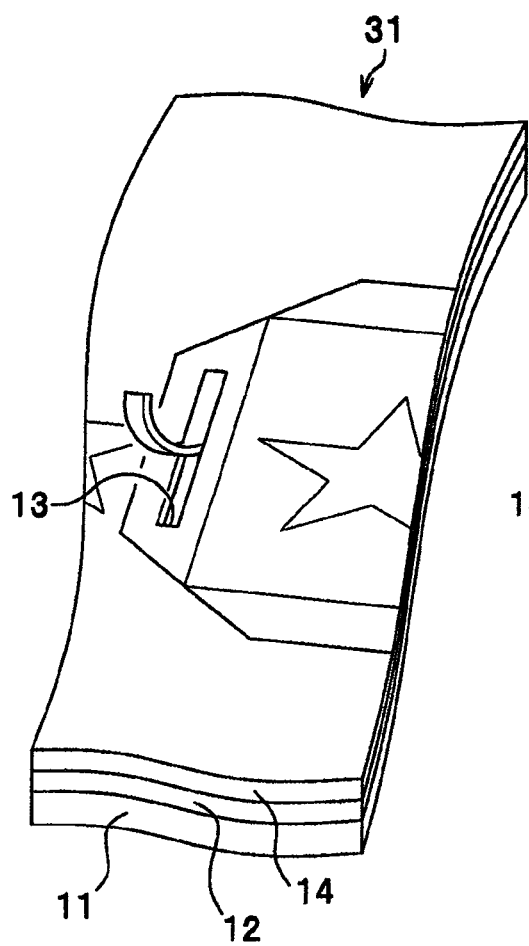
Figure 13C:
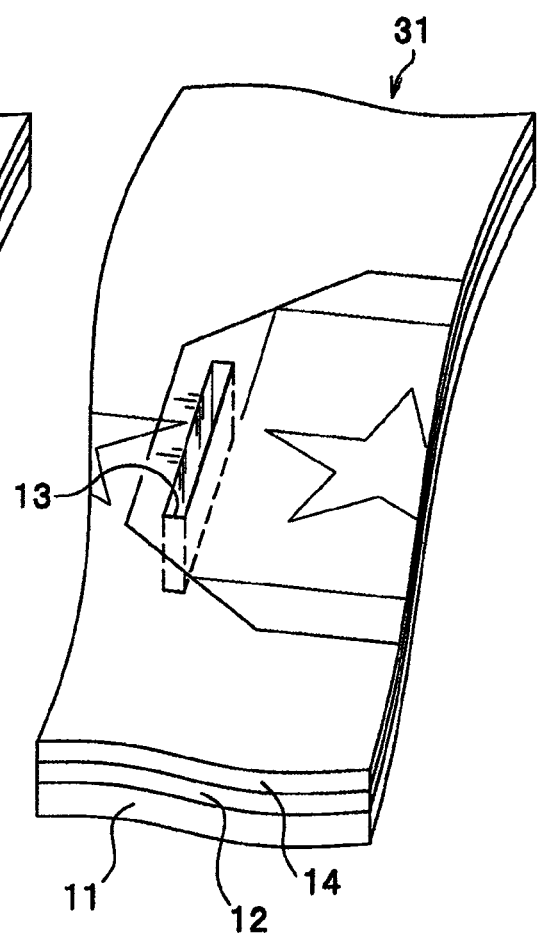

FIGS. 13A to 13C are explanatory views showing the step of forming a slot 13.

If the step of forming a slot 13 is performed simultaneously when the structural material 31 shown in FIG. 13A is blanked, this is preferable in terms of productivity.

In a first method shown in FIG. 13B, when the structural material 32 (after being blanked) is blanked, the slot 13 is formed by making a cut to the layer of the metallic film 12 and peeling it, and the layer of the base material 11 is left as it is. According to this method, the base material 11 is left as it is. Thus, there is an advantage in that the strength of the package 30 is hardly reduced.

In a second method shown in FIG. 13C, when the structural material 32 (after being blanked) is blanked, a cut is made to the layer of the base material 11, and the slot 13 is formed in the base material 11 also by punching. According to this method, since the structural material 31 is punched, there is an advantage in that attenuation of a signal passing through the slot 13 becomes small.

In addition, the slot 13 may be formed by making a cut in the metallic film 12 and removing it by means of peeling, as mentioned above, or the slot 13 may be formed by performing masking in advance so that the metallic film 12 may not be formed in a predetermined spot (area where the slot 13 is to be formed) of the structural material 32.

Figure 14A:
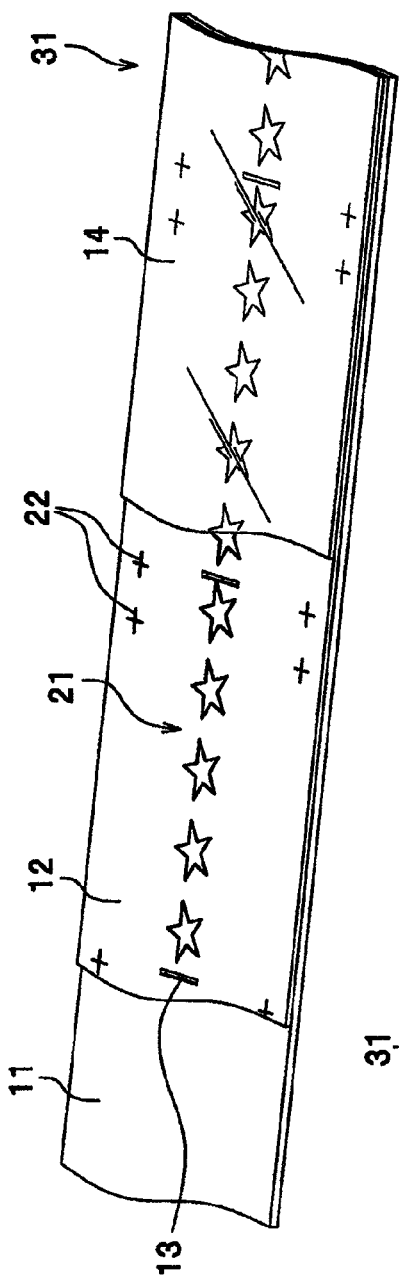
FIGS. 14A to 14C are explanatory views showing another example of forming the structural material.
Figure 14B:
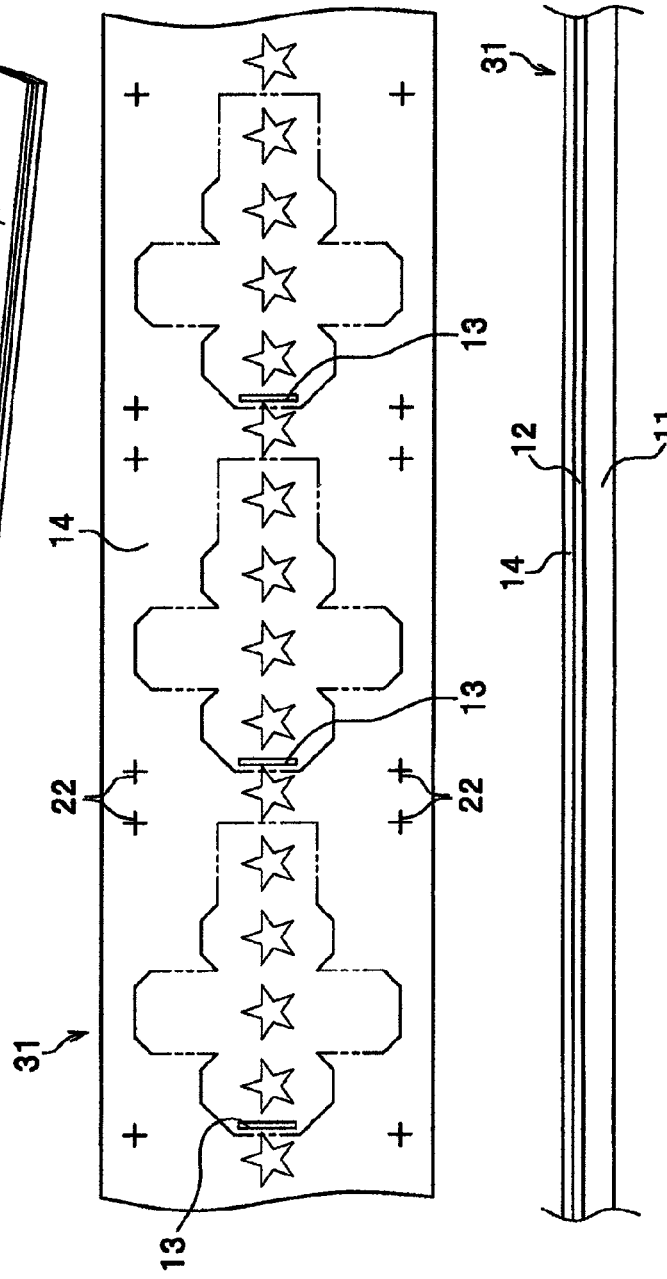
Figure 14C:
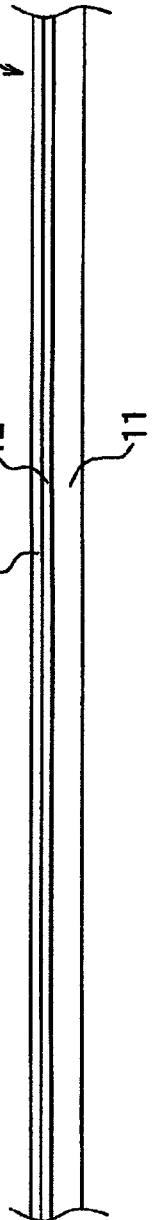

FIGS. 14A to 14C are explanatory views showing another example of forming the structural material 31.

As shown in these figures, when the metallic film 12 is formed on the base material 11, the slot 13 is formed in the metallic film 12 by performing masking in a predetermined spot. Further, at this time, in order to correctly register the slot 13, it is preferable to form alignment marks 22 in the metallic film 12.

According to this method, it is possible to save the effort of mechanically punching and forming the slot 13.

Figure 15A:
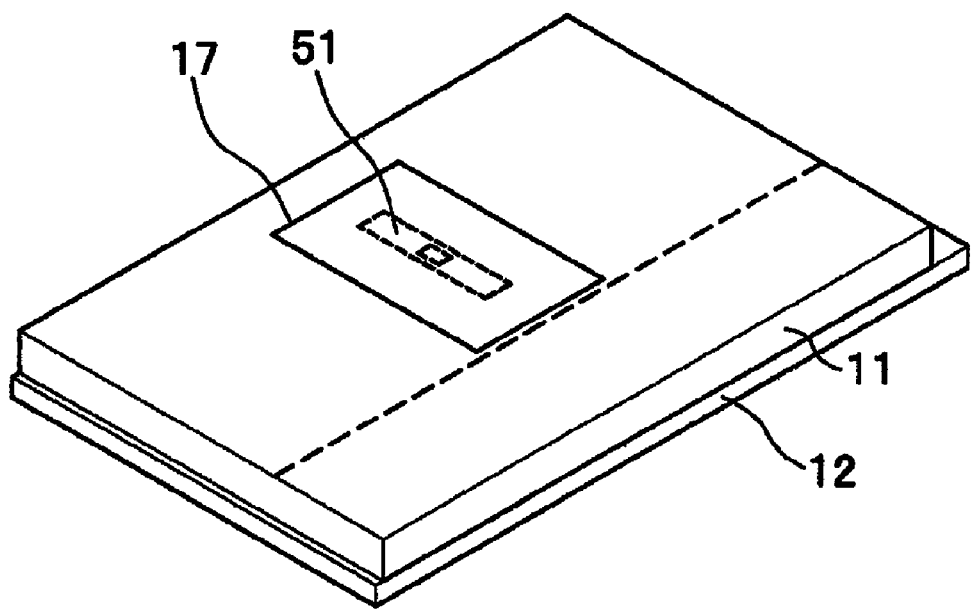
FIG. 15A is a perspective view showing the protective film formed in the inlet.
Figure 15B:
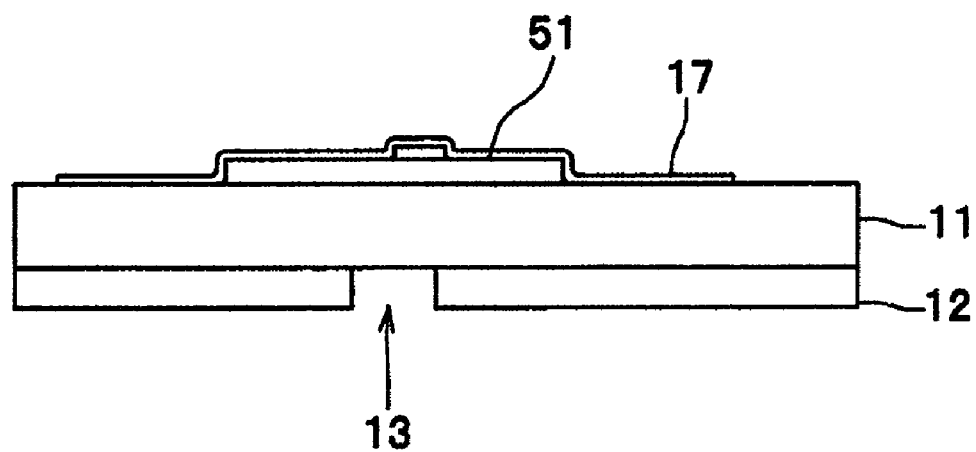
FIG. 15B is a sectional view thereof.

FIG. 15A is a perspective view showing a protective film 17 formed on the inlet 51, and FIG. 15B is a sectional view thereof.

As shown in these drawings, after the inlet 51 is pasted or formed on the base material 11 (that is, the inner surface of the folded portion 35 (refer to FIGS. 1 and 2 or the like) of the package 30), the protective film 17 that is made of a dielectric material, such as polypropylene, and has a size enough to cover the inlet 51 is pasted thereon. A sticking agent may be applied in advance on the protective film 17.

According to this configuration, the inlet 51 is protected from impact caused by the contents in the package 30.

Figure 16:
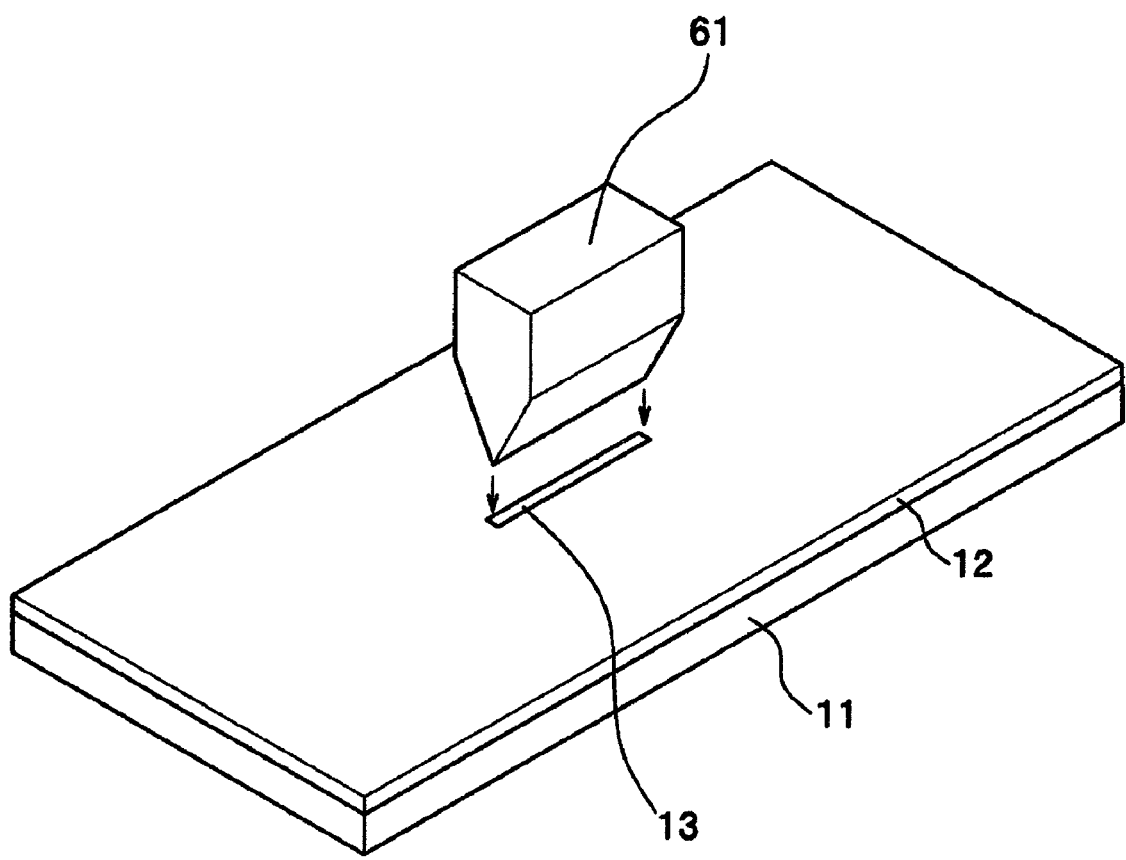
FIG. 16 is a conceptual view showing another method of forming the slot.

FIG. 16 is a conceptual view showing another method of forming the slot 13.

After the metallic film 12 is formed on the base material 11, a blade 61 is pressed against the metallic film 12 to make a cut in the metallic film 12 to form the slot 13. The length of the slot 13 is determined depending on the length of the blade 61. Further, the width of the slot 13 is determined depending on the shape of the blade 61, and a depth by which the blade 61 is pressed down.

Figure 17A:
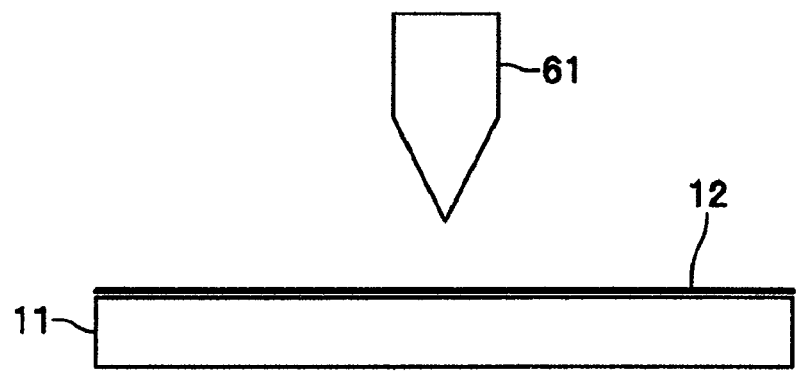
FIGS. 17A to 17C are conceptual views showing the method of forming the slot shown in FIG. 16 in detail.
Figure 17B:
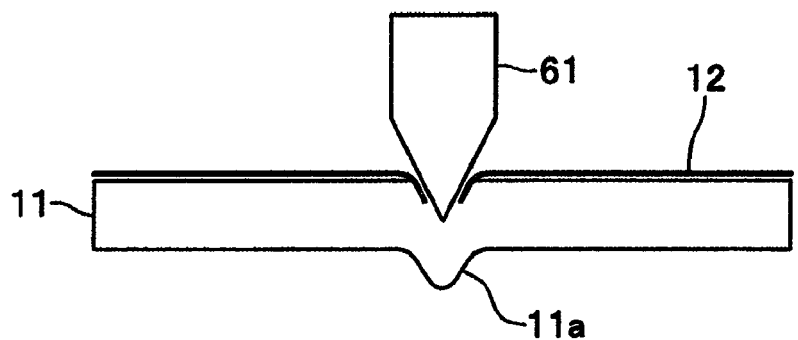
Figure 17C:
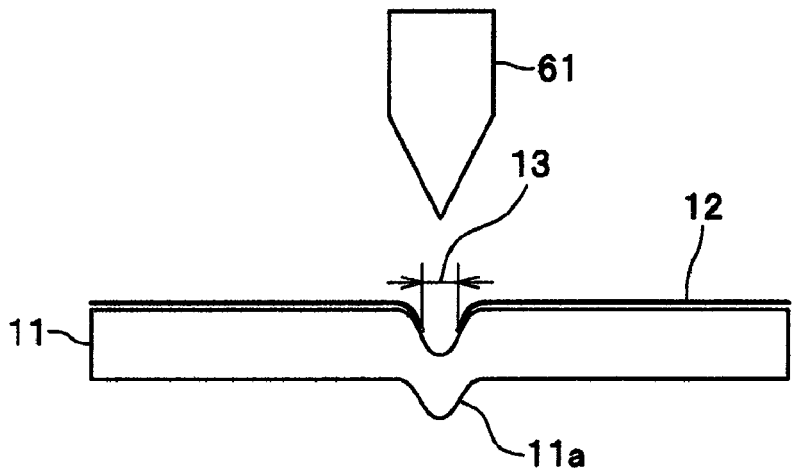

FIGS. 17A to 17C are conceptual views showing a method of forming the slot 13 shown in FIG. 16 in detail.

As shown in FIG. 17A, first, the blade 61 is positioned on the metallic film 12 formed on the base material 11. After the positioning, the blade 61 moves only in the direction of cutting (a vertical direction in the drawings).

Next, as shown in FIG. 17B, the blade 61 is pressed against the metallic film 12 to make a cut. With the invagination of the blade 61, an overhanging portion 11*a* is formed on the base material 11. Since the overhanging portion 11*a* indicates the position of the slot 13, it can be used as an alignment mark when the inlet 51 is pasted.

Also, as shown in FIG. 17C, when the slot 13 with a predetermined width has been formed, the blade 61 is returned upward.

According to this method, the slot 13 with a very fine width of, for example, 100 μm to 200 μm can be formed easily.

Figure 18A:
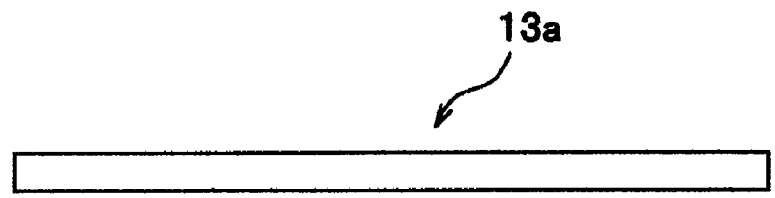
FIGS. 18A to 18C are schematic views of slots.
Figure 18B:
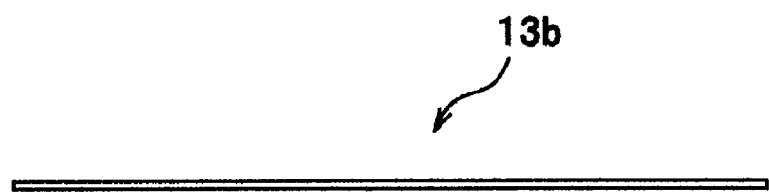
Figure 18C:
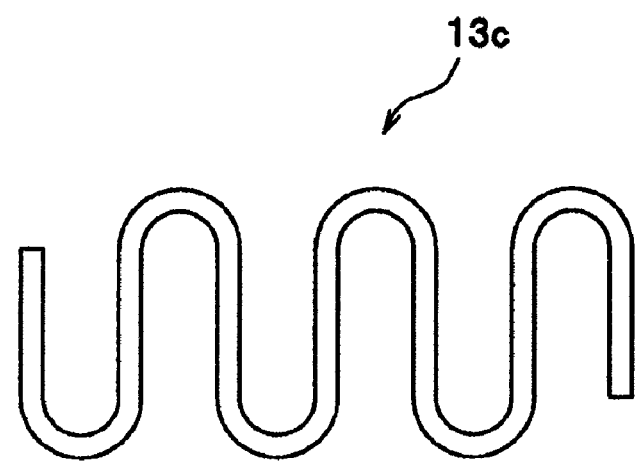

FIGS. 18A to 18C are schematic views of slots 13*a*, 13*b*, and 13*c*.

Although the slot 13*a* shown in FIG. 18A is broad, and the slot 13*b* shown in FIG. 18B is narrow, the lengths of the slots in their longitudinal direction are equal to each other, they have almost the same frequency characteristics.

Further, like the slot 13*c* shown in FIG. 18C, a meander-shaped slot can be used.

Next, individual results obtained by changing individual conditions relating to the slot 13 and measuring a communication state will be explained with reference to FIGS. 19 to 23. In addition, in these measurements, the communication frequency was 2.45 Hz.

Figure 19:
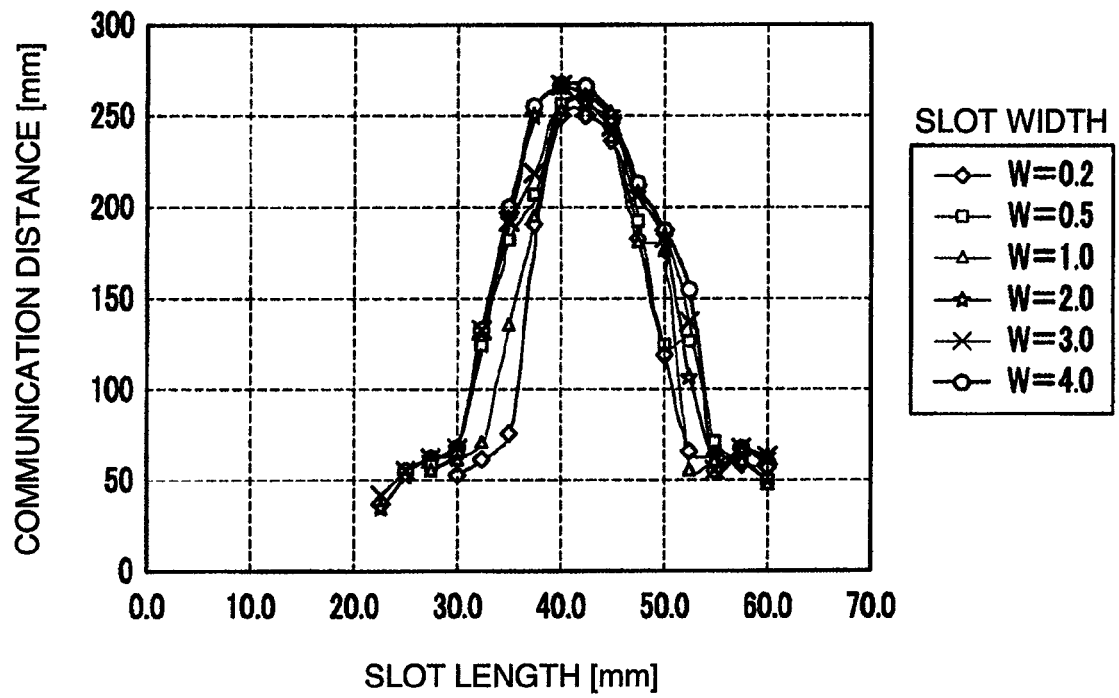
FIG. 19 is a graph showing results obtained by measuring communication distance with respect to slot length in each of different slot widths.

FIG. 19 is a graph showing results obtained by measuring communication distance with respect to slot length in each of different slot widths W.

Even if the slot width W is changed in a stepwise fashion from 0.2 mm to 4.0 mm, all slot lengths in which a maximum communication distance is obtained are about 40.0 mm, and the communication distances thereof also hardly change.

Accordingly, it turns out that the slot width W may be made small in this measurement range. The expression "the slot width W may be made small" means that, even if the slot 13 is provided in the external packaging portion 36, the design property of the package may not be spoiled if patterns to be printed on the external packaging portion 36 are contrived.

Figure 20A:
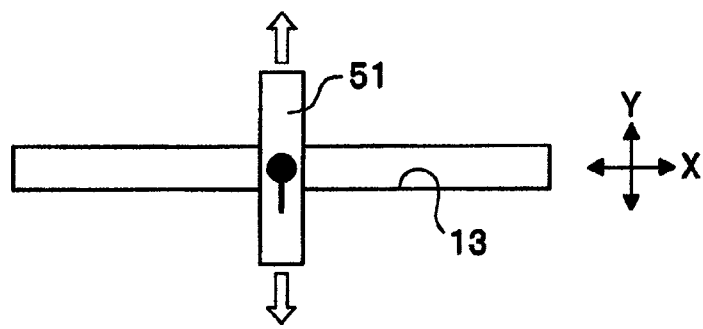
FIG. 20A is a schematic view showing that the inlet is moved in the longitudinal direction (Y-direction) thereof, on the basis of an arrangement in which the center of the slot is made to coincide with the center of the inlet.
Figure 20B:
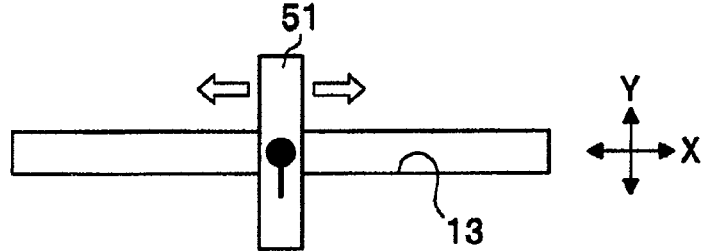
FIG. 20B is a schematic view showing that the inlet is moved in the longitudinal direction (X-direction) of the slot, on the basis of the arrangement in which the center of the slot is made to coincide with the center of the inlet.

FIG. 20A is a schematic view showing that the inlet 51 is moved in the longitudinal direction (Y-direction) thereof, on the basis of an arrangement in which the center of the slot 13 is made to coincide with the center of the inlet 51, and FIG. 20B is a schematic view showing that the inlet 51 is moved in the longitudinal direction (X-direction) of the slot 13, on the basis of the arrangement in which the center of the slot 13 is made to coincide with the center of the inlet 51.

Figure 21:
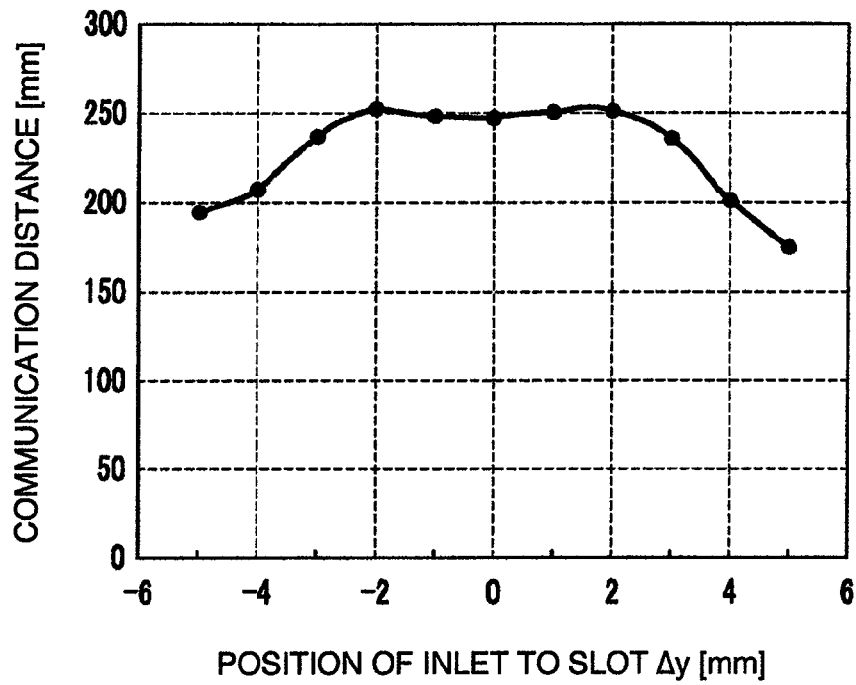
FIG. 21 is a graph showing the communication distance with respect to the position Δy of the inlet with respect to the slot.

FIG. 21 is a graph showing the communication distance with respect to the position Δy of the inlet 51 to the slot 13. That is, these measurements show results obtained by measuring the communication distance while the inlet 51 is moved as shown in FIG. 20A.

Referring to this graph, it turns out that, even if the inlet 51 is moved by about ±4 mm in its longitudinal direction (Y-direction) from a reference position, the communication distance hardly changes, and a stable communication state can be obtained.

Figure 22:
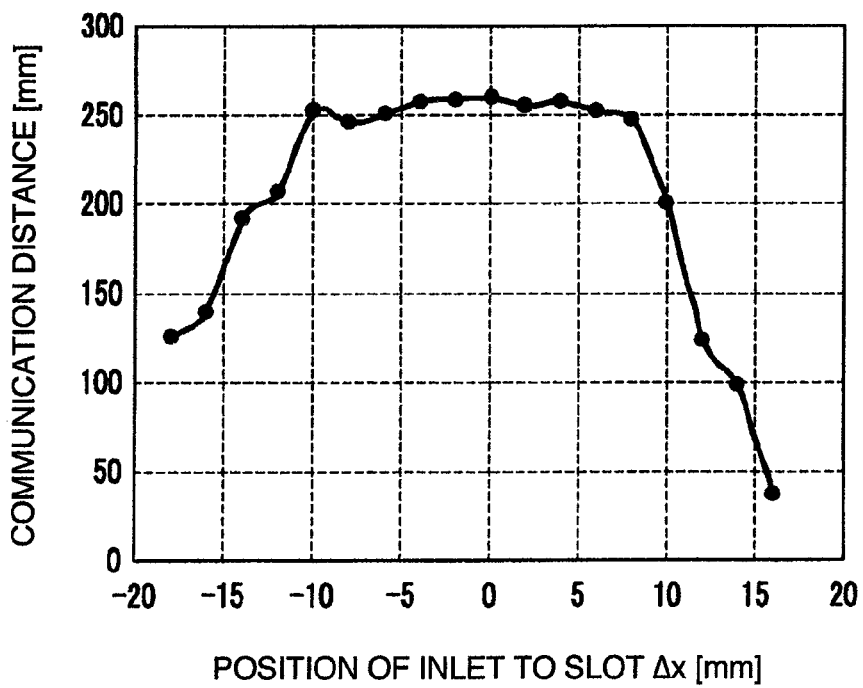
FIG. 22 is a graph showing the communication distance with respect to the position Δx of the inlet with respect to the slot.

FIG. 22 is a graph showing the communication distance with respect to the position Δx of the inlet 51 to the slot 13. That is, these measurements show results obtained by measuring the communication distance while the inlet 51 is moved as shown in FIG. 20B.

Referring to this graph, it turns out that, even if the inlet 51 is moved by about ±10 mm in a direction (an X direction) perpendicular to its longitudinal direction from a reference position, the communication distance hardly changes, and a stable communication state can be obtained.

Figure 23:
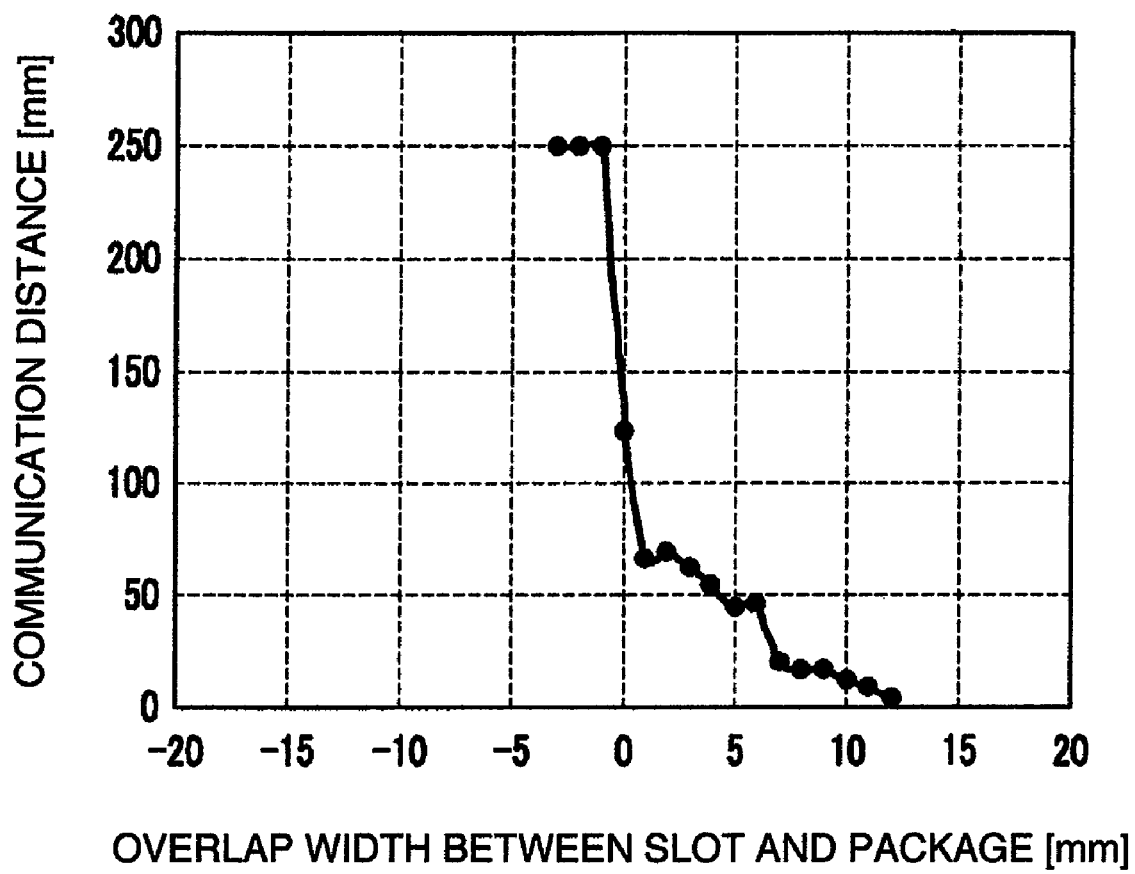
FIG. 23 is a graph showing the communication distance with respect to overlap width between the slot and the package.

FIG. 23 is a graph showing the communication distance with respect to overlap width between the slot 13 and the package 30.

It turns out that, since the communication distance decreases sharply if the overlap width between the slot 13 and the package 30 increases, attenuation by the base material 11 or the like becomes large. For this reason, it is preferable that the slot 13 is arranged as near to the outside of the overlapping portion as possible, as shown in FIGS. 10A and 10B.

Figure 24:
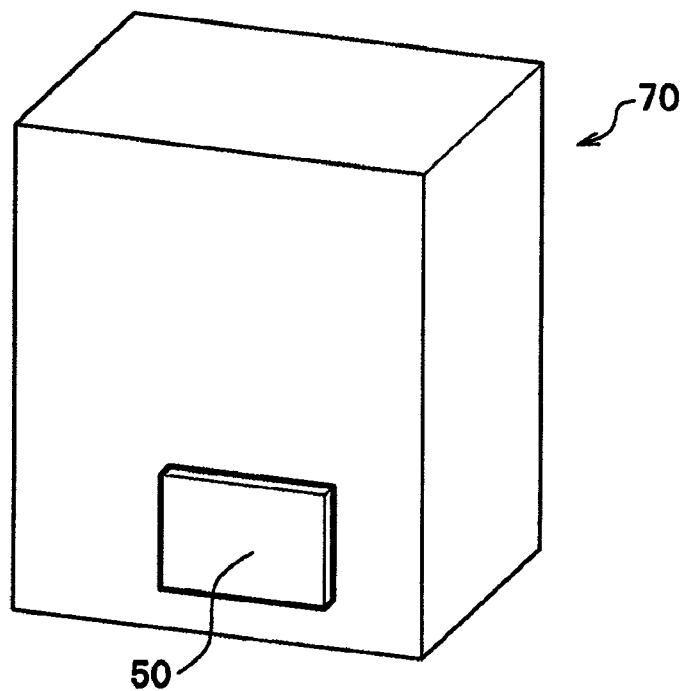
FIG. 24 is an external perspective view showing a package of a comparative example.

FIG. 24 is an external perspective view showing a package 70 of a comparative example.

In a package 70 of this comparative example, the communication distance is secured by attaching the RFID tag 50 on a metallic outer surface. Therefore, the RFID tag 50 was obliged to protrude from the outer surface. For this reason, the design property of the package 70 was spoiled conspicuously.

Figure 25:
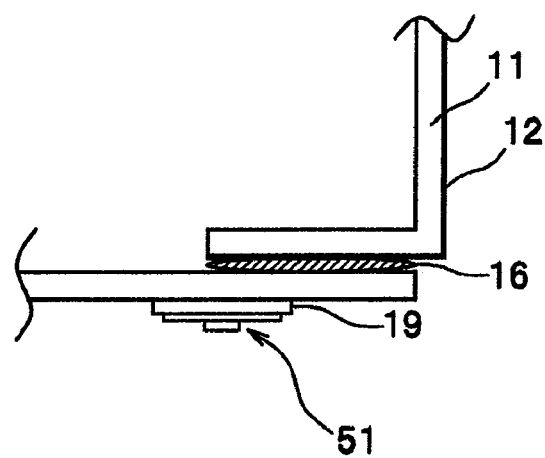
FIG. 25 is a sectional view showing an attachment portion of an inlet of the comparative example.

FIG. 25 is a sectional view showing an attachment portion of an inlet 51 of the comparative example.

The inlet 51 of the comparative example is attached to the metallic film 12 via a spacer 19 due to the aforementioned reason. If the inlet 51 is attached without the spacer 19, the communication distance becomes very short. Further, since the inlet 51 protrudes from the metallic film 12, the possibility that the inlet may be dropped out or damaged becomes large.

The technique of the invention can be applied to a storage bag of a toner cartridge of a copying machine, a storage box of pharmaceutical products, a container of milk for long storage, and the like, as well as being utilized for paper boxes for high-grade cosmetics to which the importance of the design property is attached.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An RFID tag mounting package comprising:
a package body obtained by assembling a structural material in which a conductive film is formed on a base material composed of a dielectric material;
a slot provided in said conductive film of said structural material inside a spot where a first portion and a second portion of said structural material itself overlap each other, said slot being formed between said base material of said first portion and said base material of said second portion; and
an RFID tag mounted on an inner surface of said structural material inside said spot in conformity with a position of said slot,
wherein at said spot where said portions of said structural material itself overlap each other, said portions are separated from each other via a gap or an adhesive, and
wherein a signal transmitted by said RFID tag passes through said slot to an outside of said package body via said gap or said adhesive.

2. The RFID tag mounting package according to claim 1, wherein said slot is formed by removing a layer of said conductive film in a predetermined spot from said structural material.

3. The RFID tag mounting package according to claim 1, wherein said slot is formed by punching said conductive film in a predetermined spot from said structural material.

4. The RFID tag mounting package according to claim 1, wherein said slot is formed by masking said conductive film in a predetermined spot of said structural material.

5. The RFID tag mounting package according to claim 1, wherein said RFID tag is an inlet including a dielectric film, an antenna formed on said dielectric film, and an IC chip connected to said antenna.

6. The RFID tag mounting package according to claim 5, wherein said antenna includes a matching circuit that matches input/output between said antenna and said IC chip.

7. The RFID tag mounting package according to claim 5, wherein said antenna is formed by printing a conductive material on said dielectric film.

8. The RFID tag mounting package according to claim 5, wherein said inlet is mounted using a sticking agent or a sticky tape.

9. The RFID tag mounting package according to claim 5, wherein said antenna is one of a dipole antenna, an L-shaped dipole antenna and a loop antenna.

10. The RFID tag mounting package according to claim 6, wherein said matching circuit comprises a stub formed by providing an L-shaped slit or T-shaped slit in said antenna.

11. The RFID tag mounting package according to claim 6, wherein said matching circuit comprises a U-shaped stub added to a feeding point of said antenna.

12. The RFID tag mounting package according to claim 1, wherein said structural material is obtained by further forming a protective layer made of a dielectric material, on said conductive film.

13. The RFID tag mounting package according to claim 1, further comprising a protective film that covers said RFID tag.

14. The RFID tag mounting package according to claim 1, wherein said package body is obtained by assembling said structural material so as to entirely enclose a space defined within said package body.

15. A manufacturing method of an RFID tag mounting package comprising:

a conductive film forming step of forming a conductive film on a base material made of a dielectric material to obtain a structural material;

a slot forming step of forming a slot in said conductive film of said structural material inside a spot where a first portion and a second portion of said structural material overlap each other when a package body is assembled, said slot being formed between said base material of said first portion and said base material of said second portion;

a package body assembling step of assembling said structural material in which said slot is formed; and an RFID tag mounting step of mounting an RFID tag on an inner surface of said structural material inside said spot in conformity with a position of said slot, wherein at said spot where said portions of said structural material itself overlap each other, said portions are separated from each other via a gap or an adhesive, and wherein a signal transmitted by said RFID tag passes through said slot to an outside of said package body via said gap or said adhesive.

16. The manufacturing method of an RFID tag mounting package according to claim 14, wherein, in said slot forming step, said slot is formed by removing a layer of said conductive film in a predetermined spot from said structural material.

17. The manufacturing method of an RFID tag mounting package according to claim 15, wherein, in said slot forming step, said slot is formed by punching said conductive film in a predetermined spot from said structural material.

18. The manufacturing method of an RFID tag mounting package according to claim 15, wherein said package body is obtained by assembling said structural material so as to entirely enclose a space defined within said package body.

19. A manufacturing method of an RFID tag mounting package comprising:

a conductive film and slot forming step of forming a conductive film and a slot on a base material made of a dielectric material to obtain a structural material, leaving a portion in which said slot is formed in said structural material inside a spot where a first portion and a second portion of said structural material constituting a package body overlap each other when said package body is assembled, said slot being formed between said base material of said first portion and said base material of said second portion;

a package body assembling step of assembling said structural material in which said slot is formed; and an RFID tag mounting step of mounting an RFID tag on an inner surface of said structural material inside said spot in conformity with a position of said slot, wherein at said spot where said portions of said structural material itself overlap each other, said portions are separated from each other via a gap or an adhesive, and wherein a signal transmitted by said RFID tag passes through said slot to an outside of said package body via said gap or said adhesive.

20. The manufacturing method of an RFID tag mounting package according to claim 19, wherein said RFID tag is an inlet including a dielectric film, an antenna formed on said dielectric film, and an IC chip connected to said antenna.

21. The manufacturing method of an RFID tag mounting package according to claim 19, further comprising a protective layer forming step of forming a protective layer made of a dielectric material, on said conductive film of said structural material.

22. The manufacturing method of an RFID tag mounting package according to claim 19, further comprising a protective film forming step of forming a protective film that covers said RFID tag.

23. The manufacturing method of an RFID tag mounting package according to claim 19, wherein said package body is obtained by assembling said structural material so as to entirely enclose a space defined within said package body.

* * * * *